Sept. 20, 1938.    F. M. CASE    2,130,581
FISHING REEL
Filed April 11, 1935    2 Sheets-Sheet 1

INVENTOR
FRANCIS M. CASE, DECEASED,
By LUCY H. CASE,
ADMINISTRATRIX

BY Albert L. Ely
ATTORNEY

Sept. 20, 1938.   F. M. CASE   2,130,581
FISHING REEL
Filed April 11, 1935   2 Sheets-Sheet 2
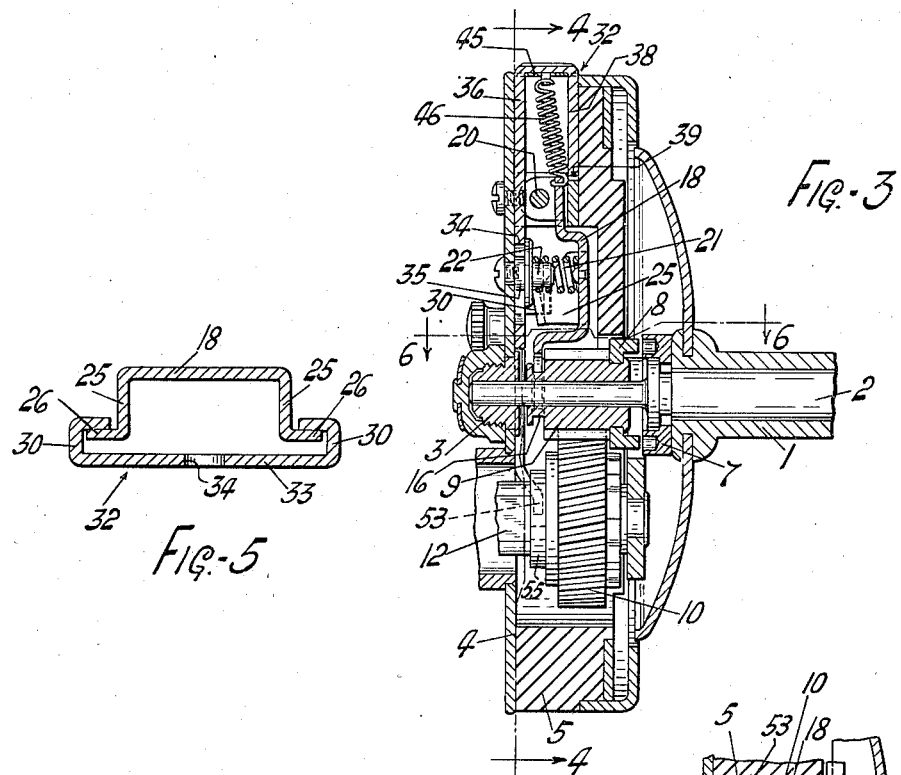
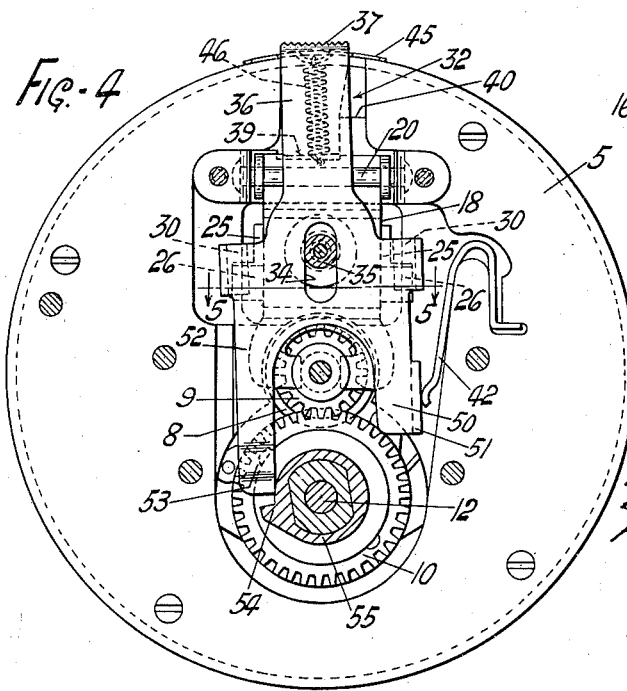
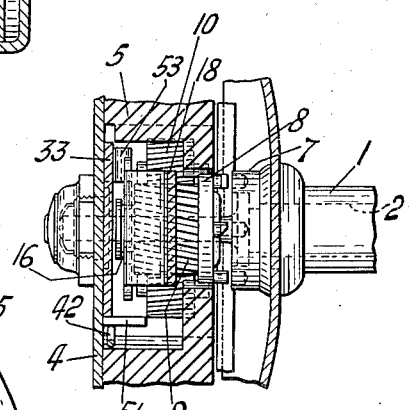
INVENTOR
FRANCIS M. CASE, DECEASED,
BY LUCY H. CASE
ADMINISTRATRIX
BY Albert L. Ely
ATTORNEY Patented Sept. 20, 1938

2,130,581

UNITED STATES PATENT OFFICE 2,130,581

FISHING REEL

Francis M. Case, deceased, late of Cleveland Heights, Ohio, by Lucy H. Case, administratrix, Cleveland Heights, Ohio, assignor to The Enterprise Manufacturing Company, Akron, Ohio, a corporation of Ohio Application April 11, 1935, Serial No. 15,808

14 Claims. (Cl. 242—84.7)

The present invention relates to fishing reels, and while it is illustrated and described as incorporated in reels of the larger or "salt water" type, it will be understood that it may be adapted to other types of reels.

The object and purpose of the invention is to improve upon reels which are provided with "free spool" mechanisms, that is to say, reels in which the spool can be disconnected from the driving mechanism so that the spool can turn freely upon its axis, as in paying out the line. This type of reel is well known, but heretofore usually has been constructed with a manually operated lever which must be operated to couple the spool with the driving mechanism. This construction has necessitated two operations when the fisherman wants to reel in the line. He must first manually operate the clutch mechanism to couple the spool and the driving gearing and then operate the crank. In the case of a "strike," these two operations will delay the fisherman at the critical moment.

It is the purpose of the invention to provide a reel of the free spool type in which the clutch or coupling device between the spool and the driving gearing will be operated automatically upon the actuation of the crank. With the mechanism shown, the fisherman has only to operate the crank and the clutch mechanism, which has been disengaged for free spool operation, will be restored to engagement so as to couple the spool and the driving gearing. The advantages are obvious, and the results more certain than with former "free spool" reel constructions, as the fisherman has only to operate the crank and the reel will at once return to its non-free spool condition.

The specification and drawings show the best known or preferred form of the invention as the same has been perfected in such manner as to enable its principles and mode of operation to be understood. The invention is not limited to the form shown, but may be embodied in other forms and may be improved or modified within the scope of the invention as set forth in the claims hereto attached.

In the drawings in which a practical and commercial form of reel for the purposes is shown:

Figure 3 is a view similar to Figure 1, but with the crank removed and showing the part with the clutch disengaged or in "free spool" position.

Figure 4 is a section on the line 4—4 of Figure 3.

Figure 5 is a detailed cross-section on the line 5—5 of Figure 4.

Figure 6 is a detailed cross-section on the line 6—6 of Figure 3; and

Figure 1:
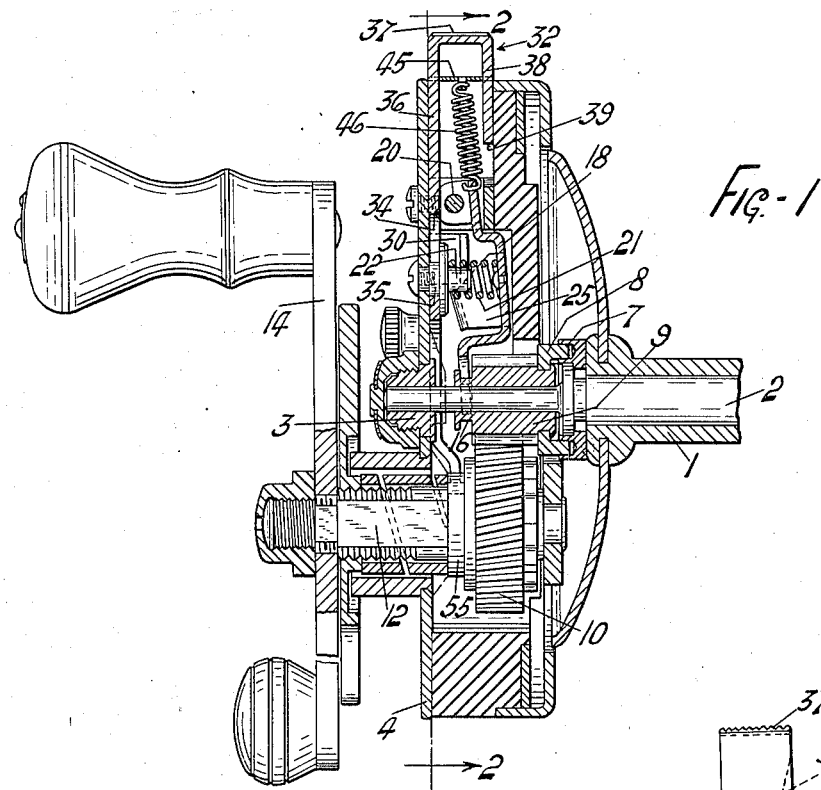
Figure 1 is a cross-section through a fishing reel having the improved mechanism incorporated therein, the front plate and a portion of the reel only being shown as the back plate may be of any standard design. The reel is shown with the spool in driving engagement.

In the drawings, the spool is designated by the numeral 1 and is of the usual construction having a shaft 2 which is reduced and supported in a bearing 3 secured on the cover plate 4. The latter is mounted on the main front plate 5, which is usually made of a hard rubber or similar composition, the cover plate 4 and front plate 5 together constituting a front head or casing that is properly formed with recesses to accommodate the various working parts hereinafter described.

Secured to the spool is the fixed member of the clutch, here shown at 7 as a ring having a plurality of recesses in which are engageable the teeth of the shiftable clutch member 8, the latter being mounted on a sleeve or pinion 9 movable along the reduced portion of the shaft 2. When the parts are in position as shown in Figure 1, the spool and the driving gear are connected, while in the position shown in Figure 3 the spool is a "free spool" reel. The outer surface of the sleeve 9 is provided with the usual gear teeth, preferably spiral, and these mesh with the main driving gear 10 which is mounted upon the drive shaft 12 to which the crank 14 is secured. In the form of the invention shown, the reel is provided with a drag mechanism between the shaft 12 and the gear 10, but this is not an essential element of the construction and may be omitted.

The outer end of the sleeve or pinion 9 is formed with a groove 16 in which is received the forked end of the clutch operating lever 18, the opposite end of which is pivoted on a pin 20 secured to the front plate. The intermediate section of the lever 18 is depressed to receive the expansion spring 21 which tends to force the clutch member 8 into driving engagement, the spring being held in position on a post 22 secured in the cover plate.

From the intermediate portion of the lever rise the two wings 25 which are formed at their outer ends with inclined shoulders 26. These shoulders constitute the means by which the lever is operated, being engaged by inturned wings 30 formed on the operating plate 32. This plate is shown in detail in Figure 7.

Figure 2:
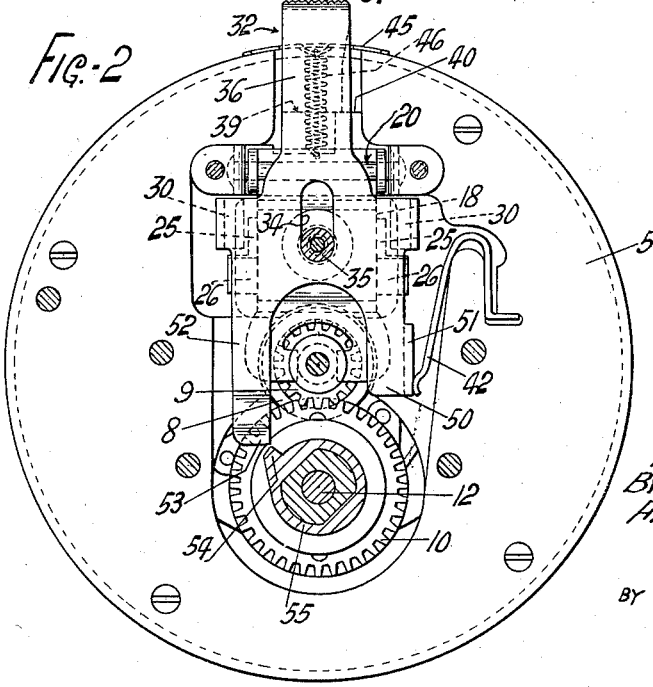
Figure 2 is a section on the line 2—2 of Figure 1 showing the mechanism below the cover plate.

The operating plate or slide 32 consists of a central portion 33 on which the wings 30 are formed and in which is located a slot 34 received over a bearing sleeve 35 on the post 22. The upper end of the plate is provided with an operating arm 36 which extends through the top plate and is provided with a knurled outer surface 37 to be engaged by the thumb when the plate is to be actuated to convert the reel into a "free spool" reel. This plate is reversely bent and provided with a detent arm 38, the lower end 39 of which is reduced, as shown. This end 39 is designed, when the plate is in outer position, to rest upon a shoulder or step 40 formed in the front plate, the whole plate being rocked on the sleeve 35 and being urged into that position by a spring 42 seated in the front plate and bearing against the inner side of the operating plate. The position is shown in Figure 2 and represents the condition of the plate when the clutch is connected. The purpose of thus rocking the operating plate is to make it necessary to move the plate to the left, as shown in Figure 2, before it can be depressed. This prevents accidental depression of the lever by a blow or pressure delivered directly on the operating plate. A light, shiftable closure plate 45, recessed to permit the movement of the arms, is mounted over the opening into the center of the reel, being held by a light spring 46, and movable with the operating plate when the latter is rocked.

Figure 7:
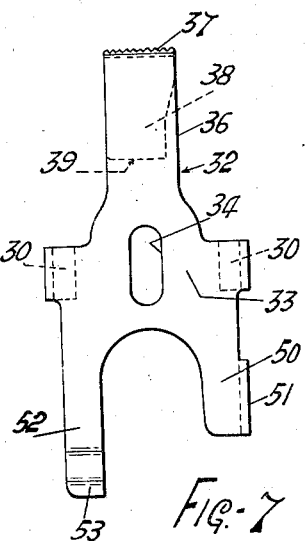
Figure 7 is a detail of the clutch actuating slide.

The lower end of the plate is forked, as shown in Figure 7, to pass on either side of the shaft 2, being provided with a short arm 50 which carries a flange 51 against which the spring 42 bears. The long arm 52 extends downwardly to a position at the side of the shaft 12, being bent inwardly to form a tongue or trigger 53 which is located in the path of a tooth 54 on the cam 55 on the shaft.

The operation of the device will be understood from the following brief description:

In the engaged or driving condition, the parts are in the position shown in Figure 1 in which the clutch members 8 and 9 are engaged and the operating plate 32 in its outer position with the arm 39 resting upon and detained by the shoulder 40. If the fisherman wishes the free spool operation, he rocks the plate to the left in Figure 2 and then depresses it, which causes the lever 18 to be rocked about pivot 20 by the engagement of the parts shown in Figure 5. This withdraws the clutch 8 to the position shown in Figure 3 and brings the tongue 53 into the path of the cam tooth 54. When the spool is to be rotated for reeling in the line, the fisherman turns the crank which causes the cam tooth to strike the tongue and move the operating plate outwardly, throwing in the clutch and restoring the parts to the condition shown in Figure 1.

It will thus be seen that the reel is automatically restored to its non-free spool condition merely by operating the crank. The clutch is positively engaged and cannot be disengaged except by the operation of the slide 32. This represents a considerable advancement because the fisherman is only required to rotate the crank and the driving mechanism is positively engaged at once.

What is claimed is:

1. In a fishing reel, an internally recessed reel head, a rotatable spool journaled at one end in said head, a main driving shaft for the spool journaled in said head, a clutch between the spool and said main driving shaft, means normally urging the clutch to spool-driving position, means under control of the operator to move the clutch to non-driving position, and means mounted on the said driving shaft, interiorly of said head to restore the said manually controlled means to the position it occupies when the clutch is in driving position.

2. In a fishing reel, a rotatable spool, a main driving shaft for the spool, a clutch between the spool and the shaft, an operating lever to engage and disengage the clutch, yielding means normally urging said lever to clutch-engaging position, a cam formation on the shaft, and trip mechanism associated with the lever for holding the latter in clutch disengaging position, said trip mechanism being actuated by the cam to release the lever and permit the yielding means to reengage the clutch.

3. In a fishing reel, a rotatable spool, a main driving shaft for the spool, a clutch between the spool and driving shaft, a lever for opening and closing said clutch, yielding means engaging said lever for urging said clutch normally to closed position, actuating means mounted on said driving shaft, and means interposed between said lever and actuating means engaging said lever to hold it in clutch-disengaging position against the force of said yielding means, and movable by said actuating means to release the lever whereby the yielding means moves said lever to effect closing of the clutch.

4. In a fishing reel, an internally recessed reel head, a rotatable spool journaled at one end in said head, a main driving shaft for the spool journaled in said head, a clutch between the spool and shaft, a lever engaging the clutch and moving it into and out of driving engagement, yielding means normally urging said lever to clutch engaging position, manually operated means to operate the lever to open the clutch, and mechanism on the shaft, interiorly of the head, operable upon movement of the shaft to engage said manually operated means, when the same is in clutch-opening position, and to so alter its position as to enable said yielding means to move the lever and re-engage the clutch.

5. In a fishing reel, a rotatable spool, a driving shaft for the spool, a clutch between the spool and the shaft, a rocking lever for moving the clutch into and out of driving engagement, yielding means engaging said lever for urging it to clutch-engaging position, a slide movable in the reel and having means to engage and swing the lever to move the clutch out of driving engagement, and means actuated by the rotation of the shaft to move the slide in the direction that disengages it from said lever.

6. In a fishing reel, a rotatable spool, a driving shaft for the spool, a clutch between the spool and the shaft, a rocking lever moving the clutch into and out of engagement, a slide movable in the reel and having interengaging means with the lever, the slide being movable manually into released position, and a cam on the shaft to move the slide in the reverse direction upon rotation of the shaft.

7. In a fishing reel, an internally recessed reel head, a rotatable spool journaled at one end in said head, a driving shaft for the spool journaled in said head, means for connecting and disconnecting the spool and shaft, said means comprising a member that projects exteriorly of the head and is manually movable to spool disconnecting position, and a device mounted on the driving shaft, interiorly of the head, and engageable with said member when the latter is in disconnecting position, for moving said member into connecting position.

8. In a fishing reel, a rotatable spool and a driving shaft therefor, a clutch between the spool and the shaft, and actuating means for the clutch comprising a slide movable in the reel in one direction to open the clutch, a portion of the slide being adjacent the shaft, and a device connected with the shaft to actuate the slide in the opposite direction.

9. In a fishing reel, a rotatable spool and a driving shaft therefor, a clutch between the spool and the shaft, and actuating means for the clutch comprising a slide movable in the reel in one direction to open the clutch, a portion of the slide being adjacent the shaft, and a cam on the shaft movable by its rotation into contact with the slide to actuate it in the opposite direction.

10. In a fishing reel, a rotatable spool and a driving shaft therefor, a clutch between the spool and the shaft, a spring normally holding said clutch in engaged position, a slide movable in the reel in two directions, inwardly to disengage the clutch against the force of said spring and outwardly to cause the spring to engage the clutch, and a device on the shaft to move the slide outwardly when the shaft is rotated.

11. In a fishing reel, a rotatable spool and a driving shaft therefor, a clutch between the spool and the shaft, a slide movable inwardly of the reel to effect release of the clutch and outwardly to effect engagement of the clutch, and a cam movable by rotation of the shaft to move the slide outwardly.

12. In a fishing reel, a rotatable spool and a driving shaft therefor, a clutch between the spool and the shaft, a slide movably inwardly of the reel to effect release of the clutch and outwardly to effect engagement of the clutch, said slide having an extension adjacent the shaft, and a cam on the shaft to strike said extension when the shaft is rotated and move the slide outwardly.

13. In a fishing reel, a rotatable spool and a driving shaft therefor, a clutch between the spool and the shaft, a slide movable inwardly of the reel to effect release of the clutch and outwardly to effect engagement of the clutch, a cam movable by rotation of the shaft to move the slide outwardly, and a detent to hold the slide in its outermost position.

14. In a fishing reel, a rotatable spool and a driving shaft therefor, a clutch between the spool and the shaft, a slide movable inwardly of the reel to effect release of the clutch and outwardly to effect engagement of the clutch, said slide having an extension adjacent the shaft, a cam on the shaft to strike said extension when the shaft is rotated and move the slide outwardly, and a detent to hold the slide in its outermost position.

LUCY H. CASE,
*Administratrix of the Estate of Francis M. Case, Deceased.*